A. T. ROCHTE.
GASOLENE LIGHTING APPARATUS.
APPLICATION FILED OCT. 27, 1911.
1,063,067.
Patented May 27, 1913.
3 SHEETS—SHEET 1.
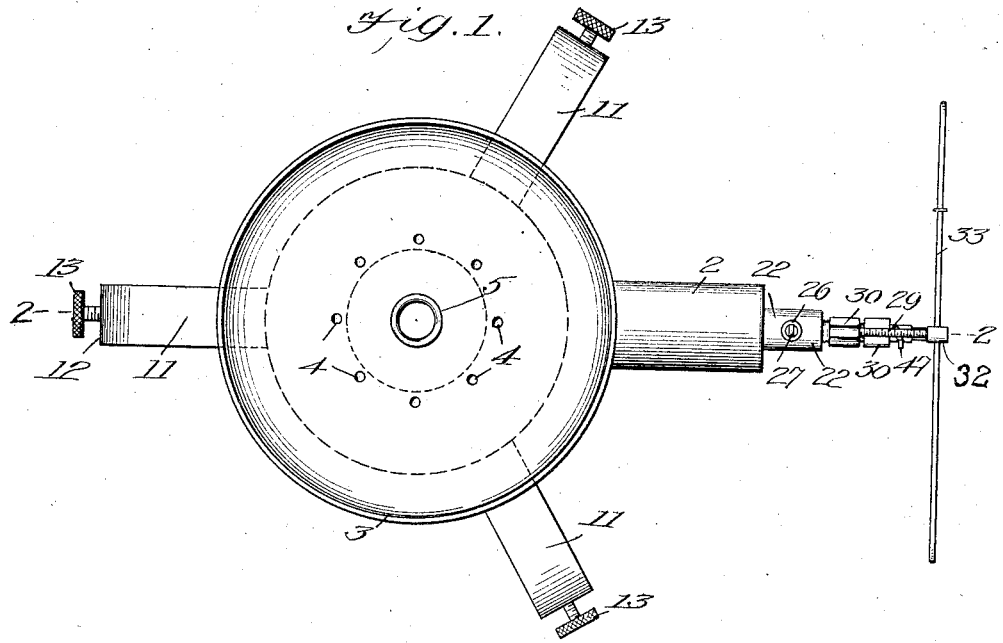
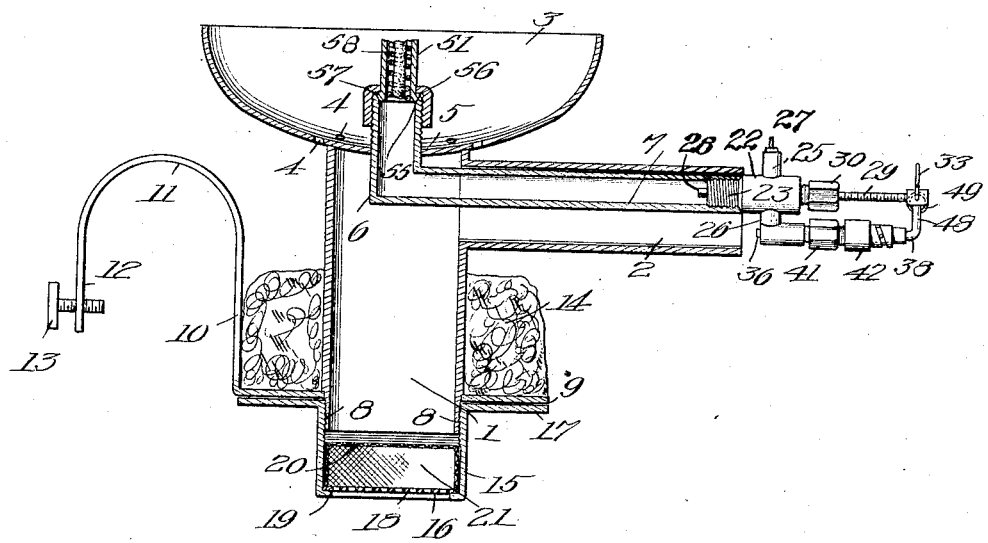
WITNESSES
E. M. Callaghan
C. E. Trainor
INVENTOR
AUGUSTINE T. ROCHTE
BY Munn & Co.
ATTORNEYS

A. T. ROCHTE.
GASOLENE LIGHTING APPARATUS.
APPLICATION FILED OCT. 27, 1911.

1,063,067.

Patented May 27, 1913.
3 SHEETS—SHEET 2.

WITNESSES
E. M. Callaghan
C. E. Trainor

INVENTOR
AUGUSTINE T. ROCHTE
BY Munn & Co.

ATTORNEYS

A. T. ROCHTE.
GASOLENE LIGHTING APPARATUS.
APPLICATION FILED OCT. 27, 1911.
1,063,067.
Patented May 27, 1913.
3 SHEETS—SHEET 3.
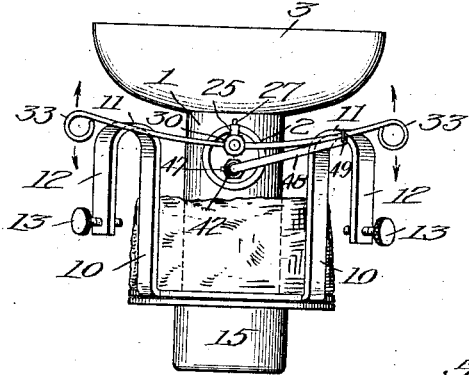
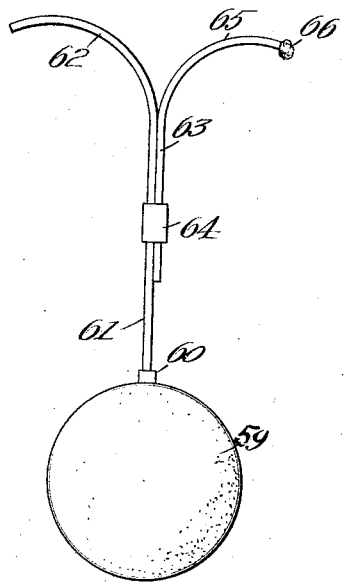
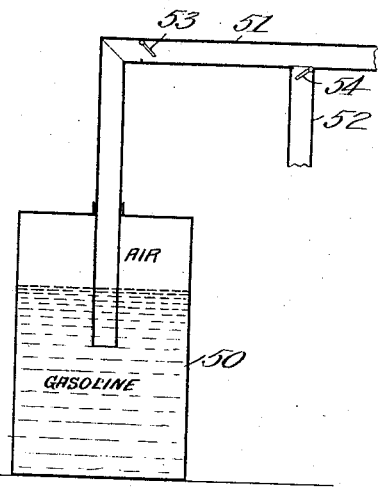
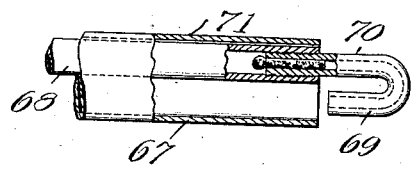
WITNESSES
INVENTOR
AUGUSTINE T. ROCHTE
ATTORNEYS

UNITED STATES PATENT OFFICE.

AUGUSTINE T. ROCHTE, OF McCLURE, OHIO.

GASOLENE-LIGHTING APPARATUS.

1,063,067.

Specification of Letters Patent.  Patented May 27, 1913.

Application filed October 27, 1911. Serial No. 657,023.

*To all whom it may concern:*

Be it known that I, AUGUSTINE T. ROCHTE, a citizen of the United States, and a resident of McClure, in the county of Henry and State of Ohio, have invented a new and useful Improvement in Gasolene-Lighting Apparatus, of which the following is a specification.

My invention is an improvement in gasolene lighting apparatus, and has for its object the provision of a simple, easily operated, and economical apparatus for gasifying the gasolene and delivering it to the burner mixed with a suitable quantity of air.

Figure 3:
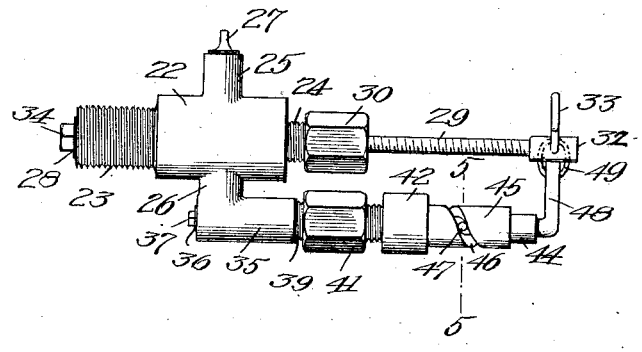
Figure 4:
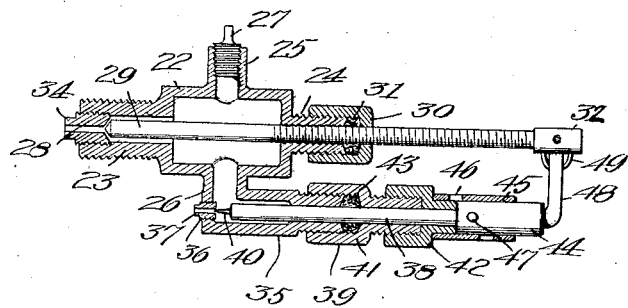
Figure 5:

In the drawings, Figure 1 is a plan view of the improvement. Fig. 2 is a section on the line 2—2 of Fig. 1. Fig. 3 is an enlarged side view of the valve mechanism. Fig. 4 is a vertical longitudinal section of the said mechanism. Fig. 5 is a section on the line 5—5 of Fig. 3. Fig. 6 is a side view of the burner. Fig. 7 is a vertical section of the tank and pipes. Fig. 8 is a front view of a device for supplying alcohol to the burner, and Fig. 9 is a modified form of generating mechanism.

In the present embodiment of the invention, a casing 1 is provided, of cylindrical form, and having a laterally extending branch or extension 2 near its upper end. A cup or dish 3 is seated on the upper end of the casing, and the said cup or dish is provided with an annular series of perforations 4 outside of the casing. The cup is also provided with a central opening 5 through which is passed one arm 6 of an elbow, the other arm 7 of the elbow extending laterally through the extension 2 of the casing at the top thereof. The lower end of casing 1 is externally threaded at 8, and a centrally perforated disk or washer 9 is arranged on the threaded portion. A plurality of arms or brackets 10 extends upwardly from the washer at spaced intervals, each arm or bracket being curved outwardly at 11 and downwardly at 12, and a set screw 13 is threaded through the extremity of each arm. The disk is designed to hold a layer 14 of asbestos wool for holding alcohol to heat the burner to start the gasifying of the gasolene. A cap 15 is threaded onto the casing below the washer, the said cap having an opening 16 in its lower end, and a lateral annular flange 17 at its upper end upon which the washer rests. A perforate disk 18 of mica rests upon the annular rib or shoulder 19 at the lower end of the cap, and a screen 20 of gauze is seated on the disk. The screen 20 is in the form of a cup, the edge or rim of the cup engaging the disk so that a chamber 21 is formed between the screen and the disk.

A casing 22 is provided at one end with a reduced externally threaded portion 23 which is threaded into the outer end of arm 7 of the elbow. The casing 22 is provided with a reduced externally threaded portion 24 at its opposite end, and with oppositely arranged lateral branches or nipples 25 and 26, the former extending upward and the latter downward. A plug 27 is threaded into branch 25 and a valve seat 28 is threaded into the reduced end 23. The inner end of the seat is conical, and a valve stem 29 is provided with a conical end forming a valve coöperating with the seat. The stem extends through the opposite end 24 of the casing, and a packing nut 30 is threaded onto the said end and holds a packing 31 between the nut and the said end of the casing. The stem is threaded from approximately its center to the opposite end from the valve seat, and the end 24 of the casing is internally threaded to receive the threaded portion of the stem. A sleeve or bearing 32 is secured on the outer end of the stem, and a lever or handle 33 extends radially from the sleeve. When the stem is rotated by the handle, the valve is moved toward and from the seat. The end of the seat is polygonal in shape, as shown at 34, to receive a wrench to remove the same, and the plug 27 is removable to permit cleaning of the casing.

The branch 26 of the casing is provided with a laterally extending portion 35, parallel with the casing, and an opening is provided in the inner side of the branch in alinement with the center of the extension 35 for engagement by a valve seat 36, the seat being threaded into the opening. The seat is provided with a polygonal portion 37 at its outer end to receive a wrench. A stem 38 is movable in the reduced outer end 39 of the extension 35 and is provided with a needle 40 extending into the bore of the seat and together with the stem closing the said bore, when the needle is engaged with the bore. A packing nut 41 is threaded onto the portion 39 of the extension, and a cap 42 is threaded onto the outer end of the nut. A packing 43 is arranged between the nut and the extension end. The stem 38 is provided with a cylindrical head 44 at its outer end, and the inner end of the head abuts against the end of the cap. A sleeve 45 is seated on the head and cap and is secured to the cap, and is provided with a spiral groove 46 in which engages a radial pin 47 on the head. When the stem is rotated, the engagement of the pin with the groove constrains the stem to move longitudinally. The stem is provided with a laterally extending handle 48 having a ring 49 which encircles one end of the lever 33. When the handle 33 is turned to operate the valve 29, the ring slides on the lever and operates the stem 38. The packings 31 and 43 are preferably composed of vaseline, graphite, and asbestos wool.

The fuel is supplied from a tank 50 having a supply pipe 51 leading to the burner and provided with a downwardly extending branch 52. A cut-off valve 53 is arranged in pipe 51, and a similar cut-off valve 54 is arranged in pipe 52. The pipe 51 opens into the arm 6 of the elbow 6, 7. The end of the said pipe 51 adjacent to the elbow is laterally flanged at 56 and seats in the conical end 55 of the elbow arm. A nut 57 is threaded onto the elbow, and holds the pipe firmly in place by its engagement with the flange. A wick packing 58 of asbestos cord is arranged in that portion of the pipe 51 adjacent to the burner, extending into the pipe for approximately 12 inches, and the said wick packing is tightly wound with fine binding wire. The packing is of a diameter to fit the pipe moderately tight.

In operation, alcohol is supplied to the layer 14 of asbestos wool, preferably by means of the device shown in Fig. 8. The said device comprises a hollow elastic bulb 59 of rubber or like material having an outlet 60 engaged by one end of a tube 61. The free end of the tube is curved laterally outward, as indicated at 62, and a rod 63 is pivoted at one end to the tube by a sleeve 64. The rod 63 has its free end curved laterally, as indicated at 65, and a ball 66 of asbestos wool is held on the said end. The curve of the portion 65 of the rod is such that when the rod is swung alongside the portion 62 of the tube, the ball 66 will be below the end of the tube.

The filling device is used to place the alcohol in the cup. The bulb is compressed and the tube inserted in the alcohol, after which the bulb is released and alcohol is sucked into the device. The rod 63 is then turned to bring the ball 66 below the open end of tube 62, and the alcohol is ejected by pressure on the bulb, into the cup and onto the ball. The alcohol flows down the outside of the casing 1, through the perforations 4, onto the layer 14 of asbestos.

The alcohol may be lighted by means of the ball 66, and the heat from the burning alcohol soon gasifies the gasolene, which is admitted to the casing 22 by the valve 29. From the casing 22, the gas is admitted to the mixing tube 2 by the valve 40. There is a space between the open end of tube 2 and the valve opening 36, so that a suitable quantity of air is mixed with the gas, and the mixture passes into casing 1 and through the screen and perforated disk to the lower end of the casing 1 where the mixture is ignited. A mantle may be connected with the said lower end, and a shade may be supported by the brackets 10.

Gasolene may be drawn from pipe 51 by means of branch pipe 52, and the valve 54 therein. By means of valve 53 all of the burners may be simultaneously cut off from the fuel. By using valve 54, the lamps and tubes may be drained of gasolene, if necessary or desirable.

The construction shown in Fig. 9 may be substituted for that shown in Figs. 3 and 4 if desired. In the said construction, a pipe 67 is the mixing tube and a pipe 68 is arranged in the same corresponding to pipe 7. A U-shaped tube consisting of branches or arms 69 and 70 has one of its arms 70 threaded into the outer end of pipe 68. The other arm 69 of the tube is directed toward the open end of pipe 67. A wick packing 71 is inserted in the end of arm 70, a portion of the packing extending into pipe 68. The operation is precisely the same as that above described, the valves being entirely omitted.

I claim:—

1. A device of the character specified, comprising a vertical casing having a lateral tubular extension near its upper end, a cup or receptacle seated on the upper end of the casing and provided with openings outside of the casing, a washer threaded onto the lower end of the casing, said washer having brackets for supporting a globe, a layer of absorbent non-combustible material on the washer, a cap having an opening in its end threaded onto the casing below the washer, a perforated disk in the cap, a gauze screen above the disk, an elbow having one arm passing through the extension, the cup having an opening for receiving the other arm, means for supplying gasolene to the vertical arm of the elbow, a valve casing threaded into the other arm and having an inlet port opening into the arm, said casing having an outlet port directed into the extension of the first-named casing, a valve controlling each port, and a common operating means for the valves.

2. A device of the character specified, comprising a vertical casing having a lateral tubular extension near its upper end, a cup or receptacle seated on the upper end of the casing and provided with openings outside of the casing, a washer threaded onto the lower end of the casing, said washer having brackets for supporting a globe, a layer of absorbent non-combustible material on the washer, a cap having an opening in its end threaded onto the casing below the washer, a perforated disk in the cap, a gauze screen above the disk, an elbow having one arm passing through the extension, the cup having an opening for receiving the other arm, means for supplying gasolene to the last-named arm of the elbow, and means for conducting the gasolene from the outer end of the elbow into the lateral extension of the first-named casing.

3. A device of the character specified, comprising a vertical casing having a lateral tubular extension near its upper end, a cup or receptacle seated on the upper end of the casing and provided with openings outside of the casing, a washer threaded onto the lower end of the casing, said washer having brackets for supporting a globe, a layer of absorbent non-combustible material on the washer, a straining device for the gas at the lower end of the casing, an elbow having a vertical arm extending above the cup and a horizontal arm within the lateral extension, means for supplying gasolene to the vertical arm of the elbow, and means for conducting the gasolene from the outer end of the elbow into the lateral extension of the casing.

4. In a device of the character specified, a casing provided with a laterally extending mixing tube near its top, a cup seated on the top of the casing and having a central opening, said cup having openings outside of the casing, means below the mixing tube for supporting a non-combustible absorbing material, an elbow having a vertical arm in the casing and passing through the opening of the cup, and a horizontal arm in the mixing tube at the top thereof, means for supplying fuel to the vertical arm of the elbow, and means on the outer end of the horizontal arm for delivering the gas to the mixing tube, said means comprising a casing having an inlet port in the horizontal arm and an outlet port directed toward the outer end of the mixing tube, a valve for controlling each port, and means for operating the valves together.

5. In a device of the character specified, a casing provided with a laterally extending mixing tube near its top, a cup seated on the top of the casing and having a central opening, said cup having openings outside of the casing, means below the mixing tube for supporting a non-combustible absorbing material, an elbow having a vertical arm in the casing and passing through the opening of the cup, and a horizontal arm in the mixing tube at the top thereof, means for supplying fuel to the vertical arm of the elbow, and means on the outer end of the horizontal arm for delivering the gas to the mixing tube, said means comprising a casing having one end connected to the outer end of the horizontal arm and having an outlet port directed toward the open end of the mixing tube.

6. In a device of the character specified, a casing provided with a laterally extending mixing tube near its top, a cup seated on the top of the casing and having a central opening, said cup having openings outside of the casing, means below the mixing tube for supporting a non-combustible absorbing material, an elbow having a vertical arm in the casing and passing through the opening of the cup, and a horizontal arm in the mixing tube at the top thereof, means for supplying fuel to the vertical arm of the elbow, and means on the outer end of the horizontal arm for delivering the gas to the mixing tube.

7. In a device of the character specified, a mixing tube, a gasolene supply tube of small diameter in the mixing tube at the top thereof, and a valve casing connected to the gasolene supply tube and provided with an opening connecting with the said tube and with an opening directed toward the adjacent end of the mixing tube, a valve seat threaded into each of the openings, a valve stem for each opening having a valve coöperating with the adjacent seat, means in connection with each stem for constraining the stem to move longitudinally when it is rotated, a handle on the stem adjacent to the inlet port for operating said stem, a handle on the other stem, and a ring on the handle engaging the first-named handle.

AUGUSTINE T. ROCHTE.

Witnesses:
 STELLA TABLER,
 ORVILLE SMITH.

Copies of this patent may be obtained for five cents each, by addressing the "Commissioner of Patents, Washington, D. C."